(12) United States Patent
Atang et al.

(10) Patent No.: US 11,305,698 B2
(45) Date of Patent: Apr. 19, 2022

(54) POWER SLIDING CENTER CONSOLE AND METHOD OF OPERATING SAME

(71) Applicant: Brose Fahrzeugteile SE & Co. Kommanditgesellschaft, Bamberg, Bamberg (DE)

(72) Inventors: Alexander Atang, Auburn Hills, MI (US); Stephen Nawrocki, Royal Oak, MI (US); Matthias Buehler, Shelby Township, MI (US); Robert Trask, Waterford, MI (US); Markus Wunder, Viereth-Trunstadt (DE); Detlef Russ, Ebersdorf b. Coburg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 173 days.

(21) Appl. No.: 16/786,611

(22) Filed: Feb. 10, 2020

(65) Prior Publication Data
US 2021/0245666 A1 Aug. 12, 2021

(51) Int. Cl.
*B60R 7/04* (2006.01)
*B60R 11/00* (2006.01)

(52) U.S. Cl.
CPC ......... *B60R 7/04* (2013.01); *B60R 2011/0007* (2013.01)

(58) Field of Classification Search
CPC .................... B60R 7/04; B60R 2011/0007
USPC .................... 296/24.34, 37.8, 37.1, 1.09
See application file for complete search history.

(56) References Cited

U.S. PATENT DOCUMENTS

| | | | |
|---|---|---|---|
| 10,011,240 B1* | 7/2018 | Ranganathan | B60R 16/03 |
| 2004/0026947 A1* | 2/2004 | Kitano | B60R 11/0211 |
| | | | 296/24.34 |
| 2008/0290680 A1* | 11/2008 | Busha | B60N 3/101 |
| | | | 296/24.34 |
| 2010/0078954 A1* | 4/2010 | Liu | B60N 2/793 |
| | | | 296/24.34 |
| 2019/0315281 A1* | 10/2019 | Lee | B60R 7/04 |
| 2020/0156553 A1* | 5/2020 | Kang | B60R 7/04 |
| 2021/0086699 A1* | 3/2021 | Chen | B60R 7/04 |

* cited by examiner

*Primary Examiner* — D Glenn Dayoan
*Assistant Examiner* — E Turner Hicks
(74) *Attorney, Agent, or Firm* — Brooks Kushman P.C.

(57) ABSTRACT

A center console may include a moving portion, a motor, and a controller. The moving portion may be configured to move between a first position and a second position. The motor may be configured to move the moving portion between the first position and the second position. The controller may be configured to, responsive to moving the moving portion in a first direction towards the first position, a number of motor position increments exceeding a first threshold within a period, and an absence of location data of a position of the moving portion, stop the motor.

8 Claims, 5 Drawing Sheets

POWER SLIDING CENTER CONSOLE AND METHOD OF OPERATING SAME

TECHNICAL FIELD

The present disclosure relates to an interior component such as a center console assembly provided with a moving portion.

BACKGROUND

Certain vehicle components may include a moveable portion that may translate, rotate or, pivot with respect to a fixed portion of the components or another portion of the vehicle. The moving portion of the vehicle components may be driven by an electric motor in response to actuating a switch by a user or in response to satisfying a condition in one or more algorithms programmed in a controller.

As the moving portion moves it may trap or pinch an object or a portion of user's body that is disposed between the moving portion and fixed portion. An apparatus and method of operating the same configured to accurately detect such occurrences are required.

SUMMARY

According to one embodiment, a center console for use in a vehicle is provided. The center console may include a moving portion, a motor, and a controller. The moving portion may be configured to move between a first position and a second position. The motor may be configured to move the moving portion between the first position and the second position. The controller may be configured to, responsive to moving the moving portion in a first direction towards the first position, a number of motor position increments exceeding a first threshold within a period, and an absence of location data of a position of the moving portion, stop the motor.

According to another embodiment, an interior assembly for use in a vehicle is provided. The interior assembly may include a moving portion, a motor, and a controller. The moving portion may be configured to move between a first position and a second position. The motor may be configured to move the moving portion between the first position and the second position. The controller may be configured to, responsive to absence of location data, change from a normalized state to a de-normalized state. When the controller is in the normalized state, the controller may be configured to send a first signal to the motor to move the moving portion at a first speed, and when the controller is in the de-normalized state, the controller may be configured to send a second signal to the motor to move the moving portion at a second speed that may be less than the first.

According to yet another embodiment, interior assembly for use in a cabin of a vehicle and having a moving portion, configured to move between a first position and a second position, and a motor configured to move the moving portion, is provided. The interior assembly may include a controller that may be configured to, responsive to recorded location data, operate in a normalized state, and responsive to absence of location data, change from the normalized state to a de-normalized state and send first signals to notify a user of a de-normalized state.

DETAILED DESCRIPTION

Figure 1:
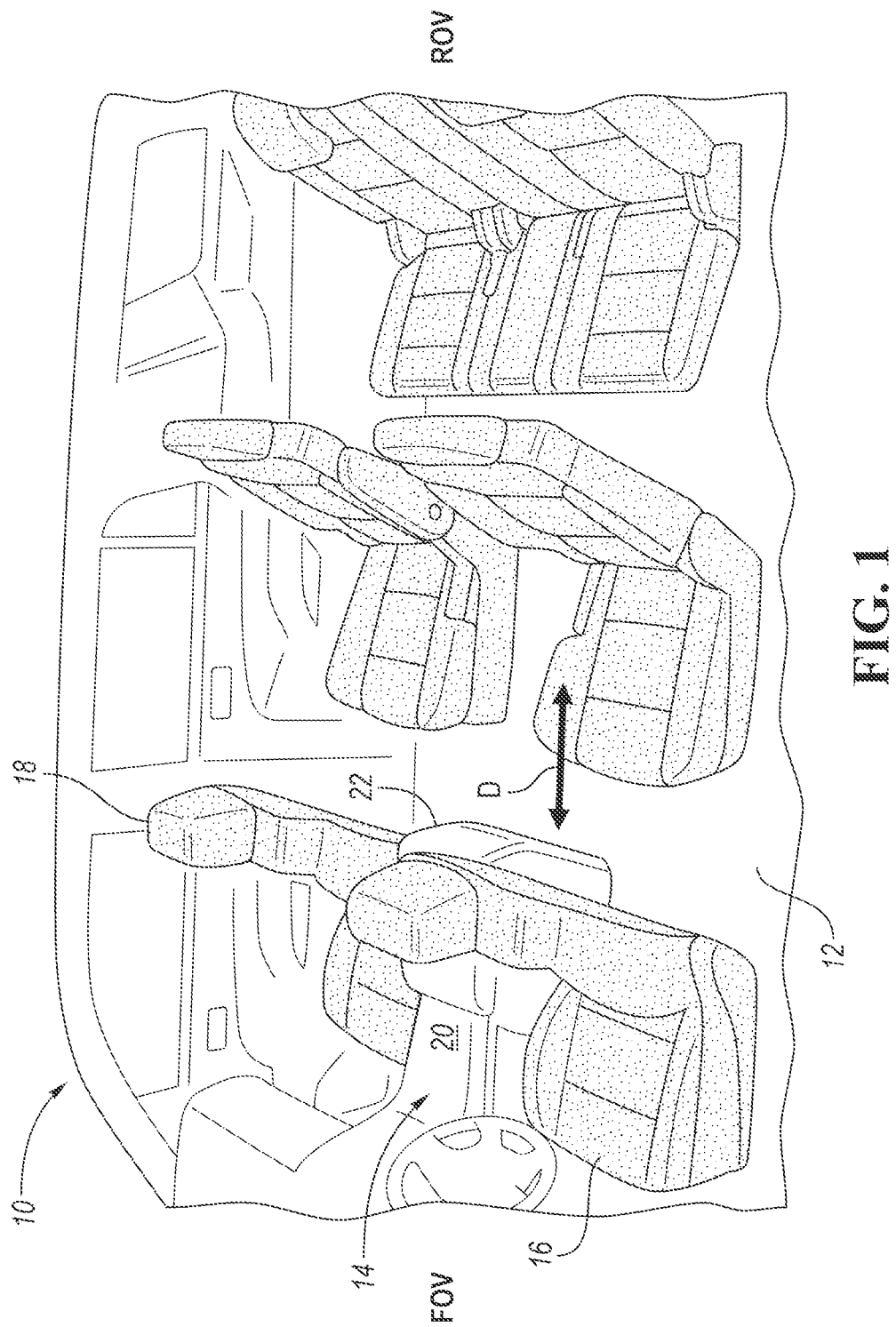
FIG. 1 illustrates an exemplary vehicle cabin including an interior assembly such as a moving center console.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Anti-trap or anti-pinch algorithms are widely used in vehicle assemblies such as window regulators or lift gates. Generally, windows and liftgates are often in a closed position and against an end stop, e.g., seal, as the vehicle is driven. In contrast with an interior component, such as a center console, a moveable portion of the center console may be positioned in an intermediate position between a pair of end stops. Because the moveable portion may be positioned between the end stops or at an end stop that is spaced apart from a fixed mating component, a pinch condition may be more likely to occur with the interior components versus a window regulator or liftgate.

A powered window regulator configured to move a pane of glass between an open position and a closed position may include a motor operated by a controller. In order for the controller to determine whether the window pane is in an open position, where a pinch condition may occur, the controller must have location data indicative of a relative position of the window pane with respect to either a full down position, or a full up position, or both. As the motor moves the window pane into the full up position, the pane of glass engages the seal such that force applied by the seal against the window increases until the motor stalls. The controller in the window regulator may then receive data from the motor, indicative of the motor stall condition, and associate the location of the window pane during the stall condition as a reference point. The distance traveled by the window pane after moving the window pane may then be recorded by the controller.

If the controller of the window regulator does not know the relative location of the window pane, the controller may provide a visual warning to a user. The visual warning may instruct the user to move the window pane to a full up or full down position or perform another operation to reset the controller of the window regulator.

Interior components such as power sliding center consoles generally do not include a seal that the moving portion of the center console may run into or engage. Because of strength requirements, mechanisms for actuating e.g., translating, rotating, pivoting a moving portion of an interior component are generally formed by generally rigid components. As such, as the moving portion reaches an end position, formed by a rigid end stop, the reactionary force applied by the end stop to the moving portion is much higher and more sudden than a reactionary force applied from a seal engaging a window pane. Because of the relatively larger and more sudden reactionary forces, one or more components of the mechanism or moving portion may degrade and decrease the longevity of the interior component.

Also, as mentioned above, the moving portion of the center console may be more susceptible to pinch conditions because the moving portion may be disposed between the end stops or end positions of the travel range more frequently than a glass pane or liftgate of a vehicle. Moreover, power sliding center consoles are generally not capable or configured to warn a user that a pinch condition may occur due to absence of location data.

FIG. 1 illustrates a vehicle 10, in particular, a vehicle cabin that includes a vehicle floor 12 and a sliding center console assembly 14 that is attached to the floor 12. The sliding center console 14 includes a fixed portion 20 and a sliding or translating portion 22. In one embodiment, the translating portion 22 of the center console assembly 14 may be coupled to and move along an elongated cavity such as a slot or track formed within the floor 12. Here, sliding center console assembly 14 is disposed in a forward position, between a driver's seat 16 and a passenger seat 18. The translating portion 22 may be configured to move along the directional arrow D.

Figure 2:
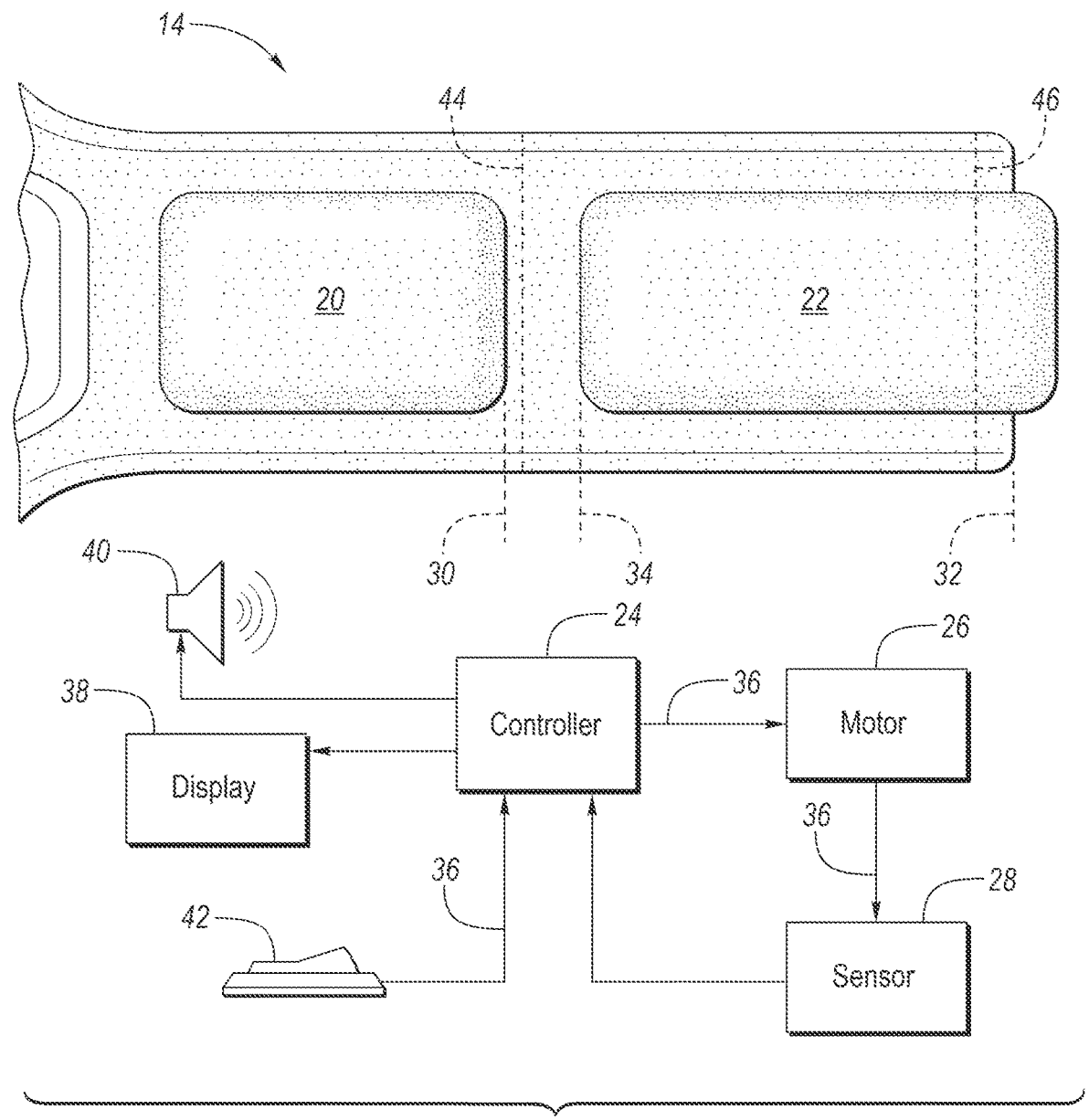
FIG. 2 illustrates an exemplary schematic diagram for an interior assembly such as a moving center console.

FIG. 2 illustrates a schematic diagram of sliding console 14 and examples of associated hardware. The moving portion 22 of the center console 14 may be moved by actuation of a motor 26. The motor 26 may be configured to move with the moving portion 22 or it may be mounted so that it is stationary with respect to the moving portion 22. The moving portion 22 may move e.g., translate between a first position 30 and a second position 32. As one example, the moving portion 22 may have one or more reference points 34 that may be used when evaluating the relative position of the moving portion 22 with respect to the first position 30 and the second position 32. As illustrated, the moving portion 22 is in an intermediary position, spaced apart from the first position 30 and the second position 32, with respect to the reference point 34. The first position 30 and the second position 32 may each be referred to or formed by end stops. For example, as the moving portion 22 is moved to a position that is adjacent to or lies against the fixed portion 20, at least a portion of the moving portion 22 may engage the first end stop at the first position 30.

In one or more embodiments, the motor 26 and moving portion 22 may vary in speed between as the moving portion moves between the first and second positions 30, 32. For example, when the moving portion 22 is within a predetermined distance of the first position 30, as represented by the dashed line 44, or when the moving portion 22 is within a predetermined distance of the second position 32, as represented by the dashed line 46, the moving portion may decelerate.

The motor 26 may communicate with a controller 24 that may provide signals 36 to control the motor 26. For example, the signals 36 may command the motor 26 to stop, reverse directions, increase or decrease speed and etc. In one or more embodiments, the controller 24 may be incorporated in the motor 26 as an ECU or the controller 24 may be separate from the motor 26. One or more sensors 28 may be provided to monitor the motor 26. As one example, the sensor 28 may be a hall effect sensor configured to recognize hall pulses generated by the motor 26. The hall pulses may represent motor position increments. The motor position increments may be communicated to the controller 24.

The controller 24 may be configured to operate in a normalized state and a de-normalized state. The controller 24 may change from the normalized state to the de-normalized state under certain conditions that may make detecting a pinch condition more difficult. As one example of such a condition, there may be an absence of location data of the moving portion 22 relative to one or more reference positions, such as the end stops 30, 32. When the controller 24 is in the de-normalized state, the controller 24 may alter operating parameters of the motor 26 and programs, such as algorithms, stored in the controller 24. In one or more embodiments, the controller 24 may be configured to send signals to alert users, such as passengers or drivers of the vehicle, of the de-normalized state and increased risk of a pinch condition.

In one or more embodiments, a display 38 may be operatively connected to the controller 24. The display 38 may be disposed in the sliding console 14. As another example, the display 38 may be provided by an entertainment module, e.g., television, that may be attached to one of the seats or the ceiling in cabin. Alternatively, the display 38 may be provided in the dashboard or other human-machine-interface disposed in the vehicle cabin. In response to the controller 24 operating in the de-normalized state, the controller 24 may send signals to the display to alert the user of the de-normalized state.

While the center console 14 illustrated includes a translating moving portion 22, one of ordinary skill in the art will appreciate that the center console 14 may include a moving portion that pivots, rotates, or moves in a non-translatable manner.

Figure 3A:
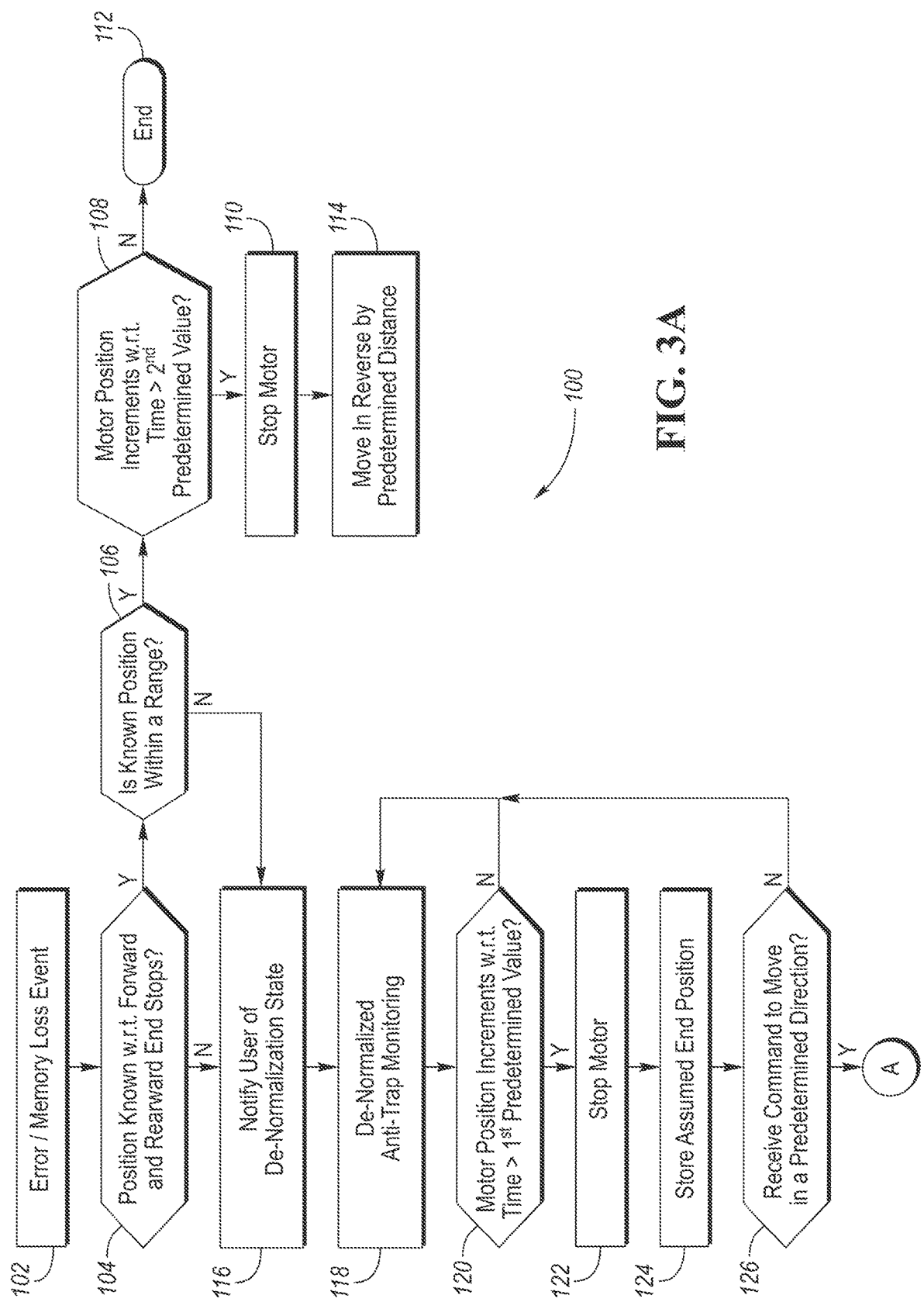
FIGS. 3A-3B are a flow chart representative of a control strategy and/or logic that may be implemented using one or more processing strategies as the interior assembly operates.
Figure 3B:
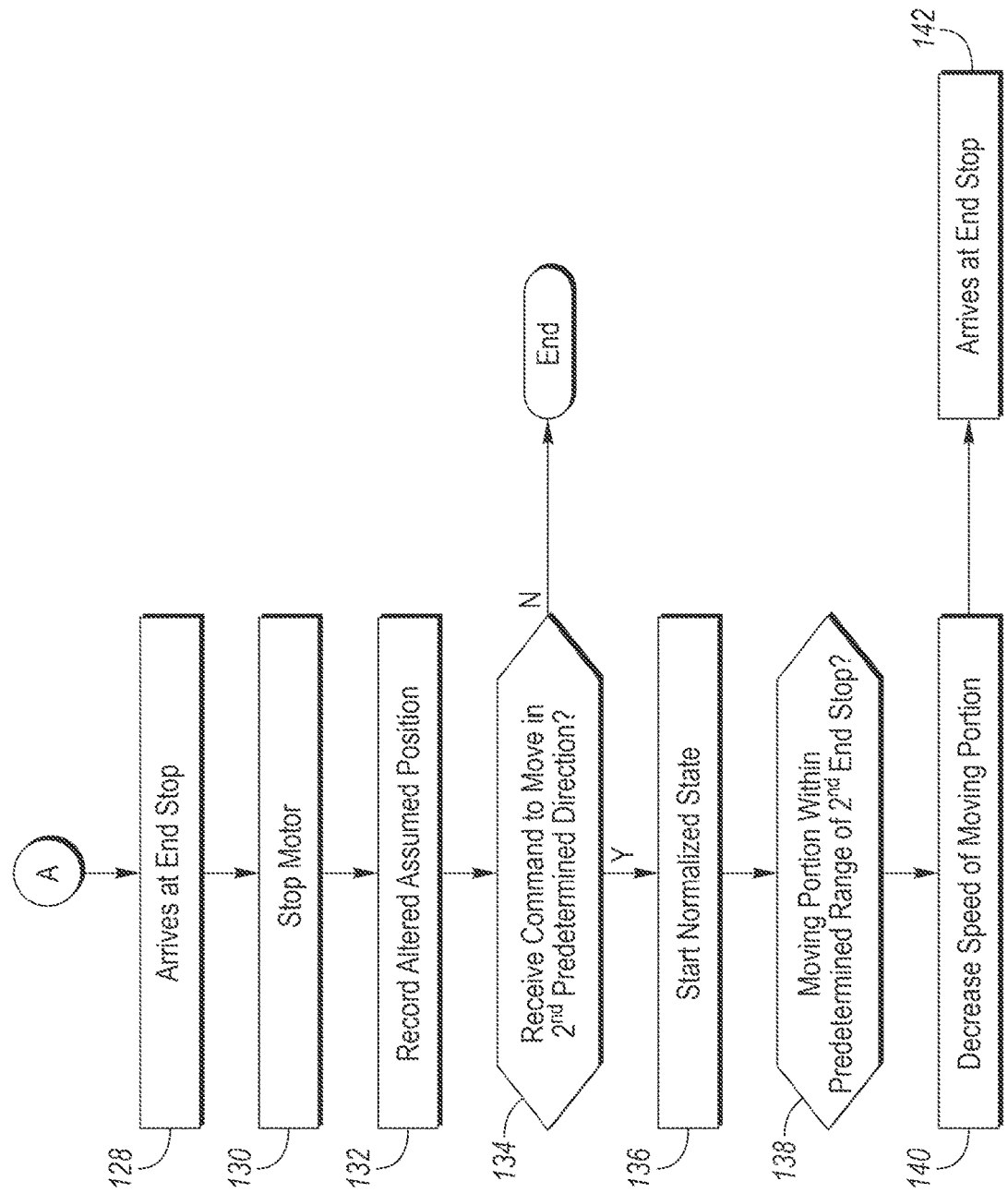

Control logic or functions performed by the controller 24 may be represented by flow charts or similar diagrams, such as the flow chart 100 in FIG. 3A and FIG. 3B. FIGS. 3A-3B provides a representative control strategy and/or logic that may be implemented using one or more processing strategies such as polling, event-driven, interrupt-driven, multi-tasking, multi-threading, and the like. As such, various steps or functions illustrated may be performed in the sequence illustrated, in parallel, or in some cases omitted.

The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 24 in controlling one or more assemblies within the vehicle interior.

Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein but is provided for ease of illustration and description. The control logic may be implemented primarily in software executed by a microprocessor-controlled vehicle, motor 26, or ECUs illustrated in FIG. 2.

The control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of several known physical devices that utilize electric, magnetic, and/or optical storage to keep executable instructions and associated calibration information, operating variables, and the like.

The control strategy may start in response to one or more trigger events represented by operation 102 or operation 104, or both. As one example, an error or memory loss event may occur as represented by operation 102. The memory loss event or error may be caused by a cessation of power as the moveable portion 22 moves and before the location data may be stored in the controller 24. A cessation of power may also cause loss of position stored in a volatile memory. As another example, a sensor error may occur so that the sensor is not able to detect signals indicative of the motor position increments. In yet another example, the controller 24 may malfunction due to a RAM/ROM read error.

After operation 102, the controller 24 may branch to operation 104, to determine whether the relative position of the moveable portion 22 with respect to either the first end stop 30 or the second end stop 32 is known. The relative position may be determined by comparing a recorded position of the moving portion 22 based on a motor position increments with subsequent motor position increments. If the relative position of the moving portion 22 with respect to the first end stop 30, or the second end stop 32, or both, is known, the known relative position may then be compared with a range of values or validity range stored in the controller 24, as represented by operation 106.

If the known position is within the validity range, the controller may branch to operation 108. In operation 108, the controller 24 may be operated in the normalized state. If motor position increments measured with respect to time exceed a predetermined value, the controller 24 may recognize this as an occurrence of a pinch condition, as represented by operation 108. In response to the recognition of the pinch condition, the controller 24 may send signals 36 to the motor 26 to stop the motor 26, as represented by operation 110. After the motor 26 is stopped, when the controller 24 is in the normalized state, the controller may send signals 36 to the motor 26 to reverse the rotational direction of the motor 26 so that the moving portion 22 moves in an opposite direction by a predetermined distance, as represented by operation 114. In one or more embodiments, the motor 26 may not stop before reversing direction, but directly reverse direction instead of stopping. Reversing the direction of the motor 26 and moving the moving portion 22 in the opposite direction may allow a user to remove the obstruction causing the pinched condition. If the position increments measured with respect to time do not exceed the predetermined value, the controller 24 may branch to operation 112 where the method ends.

If the relative position of the moving portion 22 with respect to the first end stop 30, or the second end stop 32, or both, is not known, the controller 24 may recognize this as an absence of location data and branch to operation 116. In operation 116, the controller 24 may send signals 36 to signals to notify the user that the controller 24 is in the de-normalized state. As one example, the signals 36 may be sent to the motor 26 to decrease the speed of the motor 26 and in turn the speed of the moving portion 22.

Decreasing the speed of the moving portion 22 may provide a number of advantages for detecting and mitigating a pinch condition. For example, decreasing the speed of the motor may facilitate a more accurate detection of the motor position increments with respect to time. Because the motor is rotating slower in the de-normalized state, additional time to detect and respond to motor position increments exceeding the threshold. The threshold may be altered in the de-normalized state, so that fewer motor position increments with respect to time detect the pinch condition, as represented in operation 118. As another example of the advantages associated with the de-normalized anti-trap state, decreasing the rotational speed of the motor 26 decreases the inertia of the motor 26 after the motor is stopped. The rotational speed of the motor 26 in the normalized state may be higher than the rotational speed of the motor 26 in the de-normalized state and as such, the inertia of the motor 26 after the motor 26 is stopped in the normalized state may be greater than the inertia of the motor 26 after the motor 26 is stopped in the de-normalized state. As the inertia of the motor 26 decreases, the quicker the pinch condition may be stopped and pinching forces may be reduced.

As another example, signals 36 may be sent from the controller 24 to the speaker 40, that may be disposed in an interior component such as the sliding console 14 or elsewhere in the cabin, or some combination thereof. The speaker 40 may provide an audible noise indicating that the sliding console 14 is in the de-normalized state. In one or more embodiments, the controller 24 may send signals 36 to the display 38 so that the user is alerted of the de-normalized state. In another example, in the de-normalized state, a warning signal, like an audio sound such as a beep, tone, or ding, etc., may be provided during moving of the moving portion.

After operation 118, the controller may branch to operation 120 to determine if the motor position increments exceed a threshold such as the de-normalized threshold. If the condition is satisfied, the controller 24 may branch to operation 122 to stop the motor 26. After stopping the motor 26, the controller 24 may branch to operation 124 where the controller 24 may store location data. The location data may be assumed as an end position of the moving portion 22, such as the first end stop 30 or the second end stop 32.

After operation 124, the controller may branch operation 126. In operation 126, the controller may receive a command, from the switch 42 for example, to move the moving portion 22 in a predetermined direction. In one or more embodiments, the predetermined direction may be the direction that the moving portion 22 was moving in during operations 116-120. If the moving portion 22 is not moved in the predetermined direction but moved in an opposite direction the controller may continue to operate in the de-normalized state. If the controller 24 does receive a command to move the moving portion 22 in the same direction as previously chosen, the moving portion 22 may arrive at one of the ends stops 30, 32, as represented by operation 128. The controller 24 may determine that the moving portion 22 has reached an end stop 30, 32 by determining whether a number of motor position increments with respect to time exceed a predetermined threshold, as provided in operation 108 and 120.

In response to the moving portion 22 reaching one of the end stops 30, 32, the controller 24 may send signals 36 to stop the motor 26, as represented by operation 130. After operation 130, the controller 24 may alter the assumed position recorded in operation 124. Altering the assumed position may allow the controller 24 to store accurate position data of the moving portion 22 with respect to the first end stop and the second end stop. Because the controller 24 received a command to move the moving portion in the same direction as the direction the moving portion 22 was moving during operations 116-120, the controller presumes that any obstacle detected in operation 120 was removed before the user actuates the motor 26 to move the moving portion 22. As such, the controller 24 may infer that next stop event occurs at one of the end stops 30, 32, depending on the direction of movement.

After operation 132, the controller 24 may receive a command to move the moving portion 22 in a second predetermined direction, that may be opposite the direction in operations 116-120. Because controller recorded the location data in operation 132, the controller 24 may operate in the normalized state, as represented by operation 136. After operation 136, the controller 24 may branch to operation 138. In operation 138, the controller 24 may receive signals indicative of the relative position of the moving portion 22 with respect to the end stop 30, 32 that the moving portion 22 is traveling towards. As one example, the sensor 28 may measure the number of rotations of the motor 26 to move the moving portion 22 form one of the end stops 30, 32. The number of rotations of the motor 26 may indicate the change in position of the moving portion 22 with respect to one of the end stops 30, 32. If a gear train or gear set is provided between the motor 26 and the moving portion 22, the controller 24 may be configured to account for a gear ratio provided by the gear train to calculate the position of the moving portion with respect the end stops. If the moving portion 22 is within a predetermined distance of the end stop the controller may branch to operation 140. As a non-limiting example, the predetermined distance may be in the range of 10 mm to 40 mm or between 10% to 40% of the distance between the end stops 30, 32.

In operation 140, in response to the moving portion 22 being within the predetermined distance of one of the end stops 30, 32, the controller 24 may decrease the speed of the moving portion 22. As one example, the decrease in speed may be a stepped reduction. In other words, the speed of the moving portion 22 may decrease by a predetermined percentage and remain constant until the moving portion 22 reaches one of the end stop 30, 32. As another example, the moving portion 22 may decelerate at a constant rate until the moving portion 22 reaches one of the end stop. Decreasing the speed of the moving portion 22 and motor 26 may provide a number of advantages. If the moving portion 22 moves too quickly into one of the end stops 30, 32, an undesirable noise of the moving portion 22 hitting the end stops 30, 32 may occur. Decreasing the speed of the moving portion 22 traveling into the end stop may mitigate or eliminate this noise. As another example, if the moving portion 22 contacts the end stop 30, 32 too quickly, one or more portions of the fixed portion 20 e.g., end stops 30, 32 or moving portion 22 e.g., gear train, attachment bracket, etc. may deform over life of the sliding console 14. Deformation of the moving portion or the fixed portions may result in free play between the moving portion 22 and the fixed portion 20. As another example, deformation of the gear train may result in a delay between the actuation of the motor 26 and movement of the moving portion 22.

After operation 140, the moving portion 22 may reach one of the ends stops 30, 32, as represented by operation 142.

Figure 4:
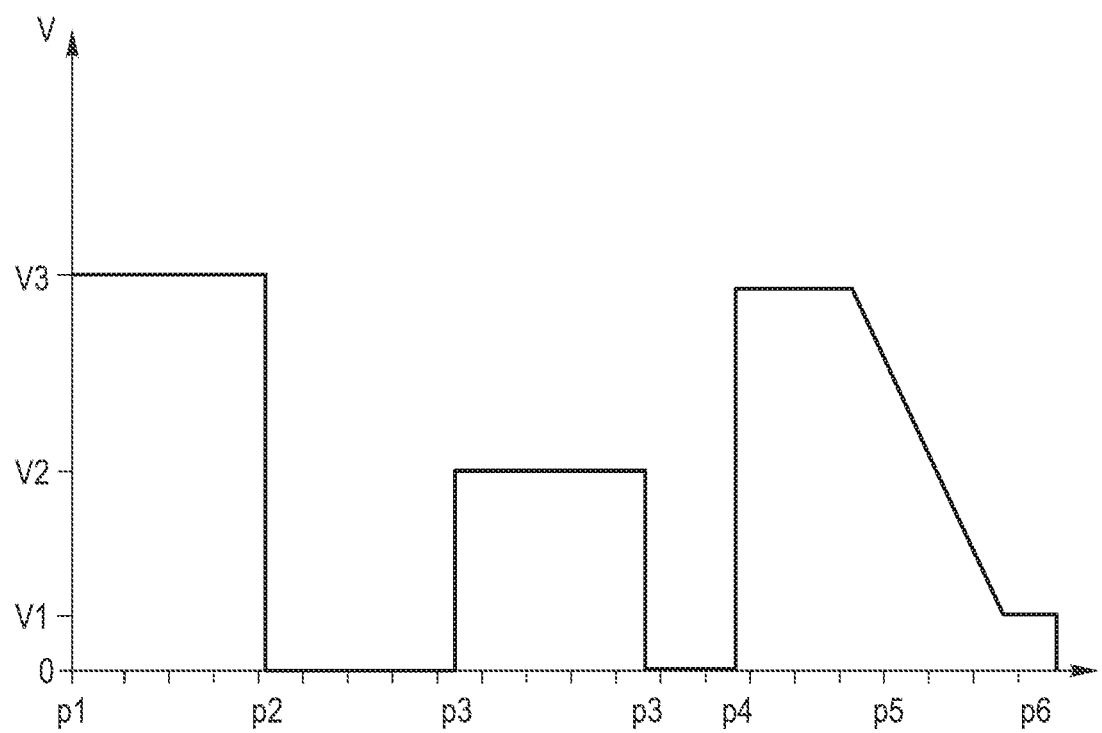
FIG. 4 is an exemplary graph of speed or velocity of a moving portion of the interior assembly with respect to time or relative position of the same.

FIG. 4 is an exemplary graph of speed or velocity of a moving portion of the interior assembly with respect to time or relative position of the same. The y-axis of the graph may represent velocity that may be measured in millimeters per second. The x-axis of the graph may represent time measured in seconds.

Between points p1 and p2, when the controller is in a normalized state, the moving portion 22, may move at a velocity V3. In response to one or more conditions, the moving portion 22 may stop. As one exemplary condition, electricity to the controller and motor may be cut off as the moving portion 22 is moving so that the moving portion stops and an error or memory loss event may occur. In response to the controller receiving power and a command to move the moving portion 22, the controller 24 may change to the de-normalized state and alert a user of the same. As previously mentioned, alerting the user may be accomplished by reducing the speed of the moving portion 22 from V3 to V2, as illustrated between points p3 and p4. If the controller changes from the de-normalized state to the normalized state and if the moving portion 22 is within a predetermined distance of either of the end stops 30, 32, the moving portion may decelerate from V3 to V1 as illustrated between points p6 and p7. After the moving portion 22 reaches the speed of V1, the moving portion may be stopped.

Figure 5:
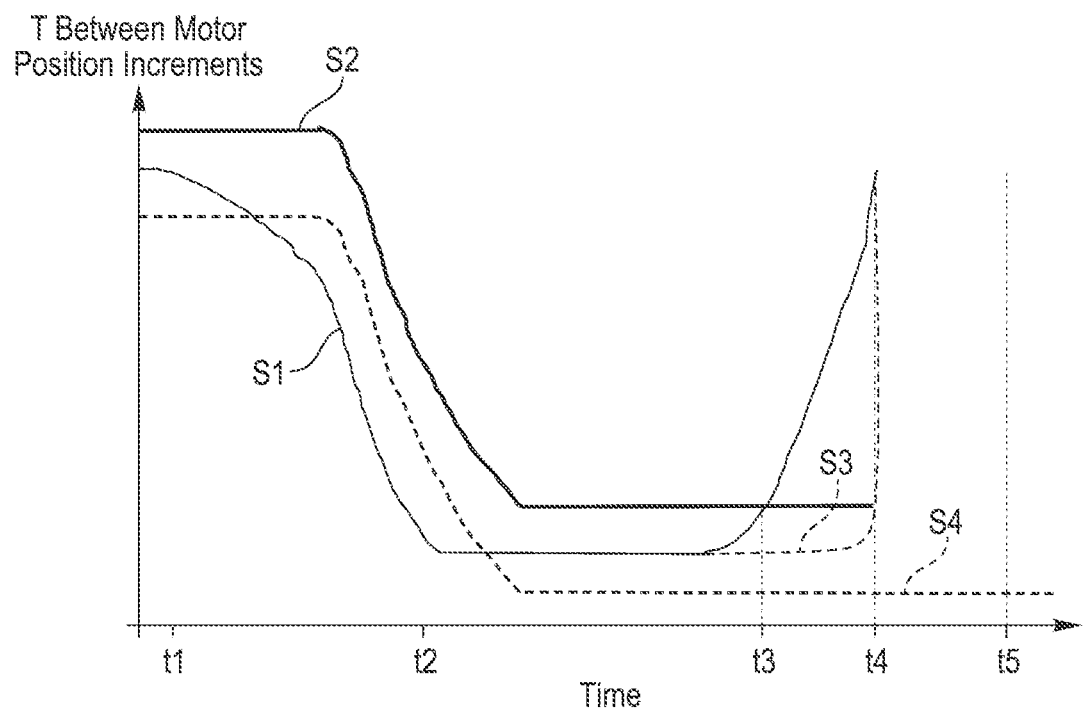
FIG. 5 is an exemplary graph of change in rotational speed of a motor or moving portion with respect to time.

FIG. 5 is an exemplary graph of change in rotational speed of a motor or moving portion with respect to time. The y-axis may generally represent motor position increments and the x-axis may represent time that may be measured in milli-seconds or seconds. As one example, the motor position increments may be based on the rotational speed of the motor, such as an amount of time between a first reference point and a second reference point of a motor. As mentioned above, the sensor 28 may be a hall pulse sensor configured to detect the presence of the first and second reference points, such as portions of a magnet within the motor and record the amount of time between the detection of the first and second reference points. As another example, the motor position increments may be based on counting ripples of the motor 26. As yet another example, other data indicative of speed of the moving portion 22, or the motor 26, or some combination thereof may be employed.

Line S1 of the exemplary graph may represent measured motor position increments, such as the rotational speed of the motor. Line S2 may represent a threshold of motor position increments, such as the rotational speed of the motor, that may be pre-programmed into the controller 24. While only one threshold line S2 is shown, one of ordinary skill in the art will appreciate that multiple threshold lines S2 may be employed. For example, line S4 may represent a second threshold of motor position increments when the controller 24 is in the denormalized state. Line S4 may define threshold values that may be lower or less than those threshold values associated with the normalized state. Lowering the threshold may be advantageous if the moving portion 22 is moving at a lower speed in the de-normalized state as compared to the speed in the normalized state. If the motor is rotating at the lower speed, the number of motor position increments within the period will be less than the number of motor position increments of the motor 26 rotating at the higher speed. Because the sensor 28 and controller 24 are receiving fewer data points, the controller 24 and sensor 28 may have a higher resolution and more be more accurate in determining a pinch condition or end position.

Line S3 may also represent measured motor position increments. Because line S1 substantially overlaps line S3 up until a point before t3, only a portion of line S3 is illustrated.

As the motor 26 is first actuated, the time between the motor increments may be relatively high and gradually decrease as represented by line S1 between t1 and t2. After reaching t2, the rotational speed of the motor 26 may be relatively constant as represented by line S1 between t2 and before t3. As line S1 intersects line S2 at point t3, the motor position increments exceed the threshold defined by S2 and be representative of a pinch condition or the moving portion 22 reaching an end stop 30, 32. As line S3 intersects line S2 at point t4, the motor position increments exceed the threshold defined by S2 and be representative of a pinch condition or the moving portion 22 reaching an end stop 30, 32. As the moving portion contacts in obstacle or an end stop 30, 32, additional torque on the motor 26 may be required to propel the moving portion 22 against the obstacle. Because of the resistance or force applied by the obstacle or the end stop 30, 32, the rotational speed of the motor may decrease. This decrease in rotational speed or increase in time between motor position increments may be indicative of an obstacle or the end stop 30, 32.

In one or more embodiments, the controller 24 may be configured to determine the rate of change in the rotational speed or time between the motor position increments to distinguish between an obstacle and the end stop 30, 32. This is generally possible if the mechanism coupled to the motor 26 is relatively stiff and generally resistant to deformation. As illustrated by the sharp rate of change of line S3 at time t4, the rotational speed of the motor decreases faster than the rate of change of the rotational speed of line S1 just before t3 to t4. Because an obstacle is generally deformable, the rate of change in rotational speed of the motor 26 in line S1 is less than the rate of change in S3. As mentioned above, the controller 24 may reverse the rotational direction of the motor 26 in response to detection of an obstacle and in response to detection of the end stop 30, 32, the controller 24 may stop the motor 26.

Between t4 and t5, the motor 26 controller 24 may continue providing signals to the motor 26 continue rotating the motor but the torque required to rotate the motor may be insufficient and the motor may be stalled. Stalling the motor 26 against the end stops 30, 32 or an obstacle may not be desirable. As one example, waiting for the motor 26 to stall in a pinch condition may not provide sufficient safety protection to users of the console. As another example, relying on the stall condition may cause excessive wear or deformation to the motor 26, mechanism, or moving portion 22.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 10 vehicle
12 vehicle floor
14 sliding console
18 seat
20 portion
22 moving portion
24 controller
26 motor
28 sensor
30 first end stop/position
32 second end stop/position
34 reference point
36 signals
38 display
40 speaker
42 switch
44 predetermined distance
46 predetermined distance
100 flow chart
102-142 operations

What is claimed is:

1. A center console for use in a vehicle, the center console comprising:
a moving portion configured to move between a first position and a second position;
a motor configured to move the moving portion between the first position and the second position; and
a controller configured to:
stop the motor in response to (1) the motor moving the moving portion in a first direction towards the first position, (2) a number of motor position increments exceeding a first threshold within a time period, and (3) an absence of location data indicating a position of the moving portion, wherein the location data is based on a stored position of the moving portion with respect to either the first position or the second position,
store a position of the moving portion as an assumed first position in response to stopping the motor,
stop the motor and store another position of the moving portion as the first position in response to receiving a command to move the moving portion in the first direction and the motor position increments exceeding the first threshold within the time period, and
move the moving portion in the first direction in response to (1) moving the moving portion in a second direction, opposite the first direction and (2) a rate of change of rotational speed of the motor exceeding a first-rate-of-change threshold.

2. The center console of claim 1, wherein the motor position increments are based on a change in rotational speed of the motor with respect to the time period and wherein the first threshold is based on a first rate of change of the rotational speed of the motor.

3. The center console of claim 1, wherein the controller is further configured to, responsive to: (1) the moving of the moving portion in the second direction, and (2) the rate of change of rotational speed of the motor exceeding a second-rate-of-change threshold, greater than the a first-rate-of-change threshold, stop the motor and record a position of the moving portion as the second position.

4. The center console of claim 3, wherein the controller is further configured to stop the motor prior to stalling the motor.

5. An interior assembly for use in a vehicle, the interior assembly comprising:
a moving portion configured to move between a first position and a second position;
a motor configured to move the moving portion between the first position and the second position; and
a controller configured to, responsive to absence of location data indicating positional information of the moving portion, change from a normalized state to a de-normalized state, wherein when the controller is in the normalized state and location data is available, the controller is configured to send a first signal to the motor to move the moving portion at a first speed, and when the controller is in the de-normalized state and location data is absent, the controller is configured to send a second signal to the motor to move the moving portion at a second speed, wherein the second speed is less than the first speed, wherein the location data is based on a stored positional value of the motor, or the moving portion, or both with respect to either the first position or the second position.

6. The interior assembly of claim 5, wherein the controller is further configured to, responsive to: (1) the controller being in the normalized state, (2) the motor rotating in a first rotational direction to move the moving portion towards the first position, and (3) a rate of change of rotational speed of the motor exceeding a first-rate-of-change threshold, send second signals to the motor to rotate the motor in a second rotational direction, opposite the first.

7. The interior assembly of claim 6, wherein the controller is further configured to, responsive to the controller being in the de-normalized state and a number of motor position increments exceeding a second threshold within a second period, stop the motor, wherein the second threshold is less than the first.

8. An interior assembly for use in a vehicle, the interior assembly comprising:
a moving portion configured to move between a first position and a second position;
a motor configured to move the moving portion between the first position and the second position; and
a controller configured to:
responsive to absence of location data indicating positional information of the moving portion, change from a normalized state to a de-normalized state, wherein when the controller is in the normalized state and location data is available, the controller is configured to send a first signal to the motor to move the moving portion at a first speed, and when the controller is in the de-normalized state and location data is absent, the controller is configured to send a second signal to the motor to move the moving portion at a second speed, wherein the second speed is less than the first speed, and responsive to the controller being in the normalized state and the moving portion being spaced apart from the first position or the second position by a predetermined distance, decelerate the motor.

\* \* \* \* \*